United States Patent Office 3,585,174
Patented June 15, 1971

3,585,174
OLEFIN COPOLYMERS AND PROCESS FOR
PREPARING SAME
Giulio Natta, Giorgio Mazzanti, Alberto Valvassori,
Guido Sartori, and Nazareno Cameli, Milan, Italy,
assignors to Montecatini Edison S.p.A., Milan, Italy
No Drawing. Filed Aug. 16, 1963, Ser. No. 303,174
Claims priority, application Italy, Aug. 17, 1962,
16,495/62
Int. Cl. C08f 5/00
U.S. Cl. 260—80.78                                    39 Claims

ABSTRACT OF THE DISCLOSURE

There are disclosed high-molecular weight copolymers of at least one polycyclic polyene having condensed nuclei and in which each pair of condensed nuclei has two carbon atoms in common, and at least one monomer selected from the group consisting of ethylene and higher alpha-olefins of the general formula R—CH$_2$=CH$_2$, wherein R is an alkyl group containing 1 to 6 carbon atoms, and more particularly such substantially linear-amorphous copolymers which are capable of being vulcanized. Also disclosed is a process for preparing the linear amorphous high-molecular weight copolymers capable of being vulcanized. The process comprises the use of catalysts acting with a coordinate anionic mechanism.

The preparation of amorphous unsaturated vulcanizable copolymers and more specifically the copolymerization of ethylene and/or higher aliphatic alpha-olefins with hydrocarbon dienes or polyenes has been disclosed. More specifically, the preparation of vulcanizable amorphous copolymers of ethylene and/or higher alpha-olefins with conjugated, non-conjugated linear or cyclic dienes has been disclosed in Italian Pats. 566,913 and 638,953 and in Belgian Pats. 623,698 and 623,741. It has been discovered, however, in accordance with this invention that by using a particular catalyst of the anionic coordinate type which is commonly referred to as the Ziegler-Natta catalyst, it is possible to prepare amorphous unsaturated copolymers capable of rendering through vulcanization elastomers having new and improved mechanical characteristics.

More particularly, it has been discovered that by using catalysts prepared from transition metal compounds of metals of Group V of the Mendelyeev Periodic Table and organometallic compounds of metals of Groups I, II and III or organometallic complex compounds of metals of Groups I and III of said table, it is possible to obtain a new class of unsaturated copolymers. These unsaturated copolymers are linear, high-molecular weight amorphous copolymers. In addition, the hydrides and complex hydrides of the above-mentioned metals may be used in combination with the transition metal compounds of Group V as the catalyst. The copolymers are prepared in the presence of the catalyst with one or more monomers selected from polycyclic polyenes characterized by having condensed nuclei wherein each pair of condensed nuclei has in common two carbon atoms and wherein the unsaturations are present only in the nuclei and with one or more monomers selected from the group consisting of ethylene and higher-aliphatic alpha-olefins. The higher-aliphatic alpha-olefins have the general formula

R—CH$_2$=CH$_2$ wherein R is an alkyl group containing one to six carbon atoms. These copolymers comprise macromolecules containing unsaturations and consist of monomeric units derived from each of the monomers used in the polymerization.

The above-mentioned results could not have been predicted, since it had been ascertained that the coordinate anionic catalyst was not capable of promoting homopolymerization of the above said polycyclic polyenes. Therefore, it could not be expected that these polyenes would copolymerize with the monoolefin monomers. Thus, it was quite surprising to find that not only did the polyenes copolymerize with ethylene and other alpha-olefins but also gave products which by vulcanization could be transformed into elastomers having new and substantially improved mechanical characteristics. These elastomers can be employed advantageously for various purposes where natural and synthetic rubbers are presently being used.

Since the polycyclic polyenes are not capable of homopolymerizing the monomeric units will not be attached directly to each other in the macromolecules of the copolymer. On the contrary, monomeric units of the polyenes will be dispersed in the polymeric chain. Consequently, since each of the monomeric units of the polycyclic polyene maintains in the polymeric chain one or more free unsaturations, the unsaturations will be dispersed also in the chain. In fact, it has been found that a particularly good result was obtained when the polycyclic polyene had its unsaturations dispersed in different cycles rather than in a single cycle.

Typical examples of polycyclic polyenes which may be employed for purposes of this invention include:

bicyclo[4,3,0]nonadiene 3–7 (4,7,8,9 tetrahydroindene)
bicyclo[4,3,0]nonadiene 2–8 (6,7,8,9 tetrahydroindene)
bicyclo[4,3,0]nonadiene 2–7 (4,5,8,9 tetrahydroindene)
bicyclo[5,5,0]dodecadiene 2–7 (8)
bicyclo[4,2,0]octadiene 3–7
bicyclo[3,2,0]heptadiene 2,6
tricyclo[4,2,0,0$^{2-5}$]octadiene 3–7
3-methyl-bicyclo[4,3,0]-nonadiene 3–7 (6-methyl-4,7,8,9-tetrahydroindene)
3–4 dimethyl bicyclo [4,3,0]nonadiene 3–7 (5,6-dimethyl-4,7,8,9-tetrahydroindene)
bicyclo[3,3,0]octadiene 2,6 (1,4,7,8-tetrahydropentalene)
bicyclo[4,3,0]nonatriene 2,4,7 (8,9-dihydroindene)
2,3,4,5-tetraphenyl bicyclo[4,3,0]nonatriene
2,4,7 (4,5,6,7-tetraphenyl-8,9-dihydroindene)
bicyclo[5,1,0]octadiene 2,5 (3,4-homotropylidene)
bicyclo[4,2,0]octadiene 2,7
tricyclo [5,3,0,0$^{2-6}$]decadiene 3,9
tetraphenyl 1,7,8,9-tricyclo[5,2,0,0$^{2-6}$]nonadiene 3,8

The monomers to be used for purposes of this invention can be prepared easily. Thus, for example 4,7,8,9-tetrahydroindene can be prepared by a Diels-Alder condensation reaction with cyclopentadiene and butadiene. Similarly, in place of butadiene, isoprene or dimethyl-butadiene may be used to obtain the corresponding methyl derivatives. The compound bicyclo(3,2,0)heptadiene 2,6 may be prepared through photoisomerization of cycloheptatriene. See Daubey and Cargill, Tetrahedron 12 (1961) 186.

The olefins which are to be copolymerized with the polycyclic polyenes consist of ethylene and the higher aliphatic alpha olefins characterized by the general formula R—CH=CH$_2$ wherein R is an alkyl group containing 1 to 6 carbon atoms. Specific examples of olefins coming within the general formula include propylene, and butene-1. By copolymerizing, for example, a mixture of ethylene, propylene and/or butene-1 with 4,7,8,9-tetrahydroindene under the conditions set forth in the process of this invention, a crude copolymerization product was obtained which comprised macromolecules consisting of monomeric units of ethylene, propylene and/or butene-1 and tetrahydroindene distributed at random. The distribution was such that in no instance did two consecutive tetrahydroindene units occur. Moreover, each of the monomeric units derived from the polymerization of the polycyclic polyene contained one or more free unsaturations. An infrared spectrographic examination of the copolymer showed the presence of unsaturations with bands at about 6 microns. These points of unsaturation are reactive and may be used for subsequent reactions. Thus, for example, it is possible to vulcanize the copolymer with sulfur-containing mixture of the type normally used for vulcanizing unsaturated rubbers. The double bonds present in the macromolecules, e.g., after oxidation with ozone may be used also to form polar groups such as carboxylic groups, which in turn can be used as reactive sites in subsequent reactions. An example would be vulcanization with a polyvalent basic material. Further, the double bonds may be used also for addition reactions with metal hydrides such as lithium hydride, $NaBH_4$, $AlH(C_4H_9)_2$, etc. The metal-to-carbon bonds formed may be used in subsequent reactions.

Copolymers prepared in accordance with this invention have a substantially linear structure as indicated by the fact that the copolymers have properties, in particular a viscous behaviour, almost identical with those of other known linear copolymers, e.g., ethylene and alpha-olefin copolymers. These copolymers have a molecular weight, determined visocosimetrically, higher than 20,000 which corresponds to an intrinsic viscosity, as determined in tetrahydronaphthalene at 135° C. or in toluene at 30° C., greater than 0.5. The intrinsic viscosity of these polymers, however, may range from about 0.5 to 10 and in many instances may achieve higher values. For most practical purposes, however, copolymers having intrinsic viscosities ranging from about 1 to 5 are preferred. The composition of the copolymers of this invention may be characterized as being practically homogeneous with the different monomeric units being distributed at random. A further characterization of the copolymer is that in no instance are two or more polyene units directly attached to one another. The homogeneity of these copolymers is confirmed by the fact that they provide good vulcanized products, utilizing vulcanization techniques used for unsaturated rubber and particularly the low unsaturated rubber such as butyl rubber. As an example, particularly good vulcanized products can be obtained from terpolymers prepared from a mixture of ethylene, propylene and 4,7,8,9-tetrahydroindene.

As a confirmation of the fact that the unsaturations are well distributed along the polymeric chain, the vulcanized products obtained from the copolymers are completely insoluble in organic solvents such as aliphatic hydrocarbons and are capable of swelling only to a limited extent in some of the aromatic solvents. In comparison, the non-vulcanized polymers are completely soluble in boiling normal heptane. Moreover, the vulcanized products exhibit good mechanical strength and a low residual deformation at break.

The catalytic systems to be employed in the process of this invention are either a solution, dispersion, or amorphous colloidal dispersion in hydrocarbons. The hydrocarbons which may be employed as the copolymerization medium include for example the aliphatic, cycloaliphatic and aromatic hydrocarbons and mixtures thereof. The catalytic systems are prepared by mixing the organometallic compounds or the hydrides of metals belonging to Groups I, II, and III of the Mendelyeev Periodic Table with compounds of the transition metals of Group V of said table. In addition, the organometallic complex compounds or complex hydrides of the metals of Groups I and III with compounds of the transition metals of Group V may be used.

The organometallic compounds or hydrides which may be employed in the preparation of a catalyst of this invention are selected from the group consisting of lithium alkyls, lithium-aluminum tetraalkyls, beryllium dialkyls, beryllium alkylhalides, beryllium diaryls, aluminum trialkyls, aluminum dialkylmonohalides, aluminum monoalkyldihalides, aluminum alkenyls, aluminum alkylenes, aluminum cycloalkyls, aluminum cycloalkylalkyls, aluminum aryls, aluminum alkylaryls, or complexes of the above-mentioned organoaluminum compounds with weak Lewis bases, lithium hydride, lithium aluminum alkylhydrides, lithium aluminum hydride, aluminum alkylhydrides, aluminum halohydride, zinc hydride and calcium hydride.

Organometallic compounds can be used also wherein the metal is bound with main valences not only to carbon and/or halogen atoms but also to oxygen atoms bound to an organic group, such as, e.g. aluminum dialkylalkoxides and aluminum alkylalkoxy-halides.

A non-restrictive example of organometallic compounds or hydrides that can be used in the preparation of the catalyst includes lithium butyl, lithium aluminum tetrabutyl, lithium aluminum tetrahexyl, lithium aluminum tetraoctyl, beryllium dimethyl, beryllium methylchloride, beryllium diethyl, beryllium di-n-propyl, beryllium di-isopropyl, beryllium di-n-butyl, beryllium di-tert. butyl, beryllium diphenyl, aluminum triethyl, aluminum tri-isobutyl, aluminum trihexyl, aluminum diethyl monochloride, aluminum diethylmonoiodide, aluminum diethylmonofluoride, aluminum di-iso-butylmonochloride, aluminum monoethyldichloride, aluminum butenyldiethyl, aluminum isohexenyldiethyl, 2-methyl-1,4-di(diisobutylaluminum)-butane, aluminum tris(dimethylcyclopentylmethyl), aluminum triphenyl, aluminum tritolyl, aluminum di(cyclopentylmethyl)monochloride, aluminum diphenyl monochloride, aluminum diisobutylmonochloride complexed with anisole, aluminum monochloro-monoethylmonoethoxide, aluminum diethyl propoxide, and aluminum monochloro-monopropyl monoethoxide, aluminum diethylmonohydride, aluminum diisobutylmonohydride, aluminum monoethylidihydride, lithium aluminum diisobutyl dihydride, aluminium chlorohydride.

The above-mentioned organometallic compounds and hydrides together with the transition metal compounds of Group V of the Mendelyeev Periodic Table are used as the catalytic system. Of the metals of Group V of the Periodic Table, the niobium, tantalum, and vanadium compounds are preferred. The niobium and tantalum compounds which may be used include the halides and oxyhalides and also compounds wherein the niobium or tantalum are linked through a valence bond to a hetero atom such as nitrogen or oxygen bound to an organic group. Typical examples of these compounds include $NbCl_5$, $NbCl_4$, $NbOCl_3$, $NbBr_5$, $NbOBr_3$, $TaCl_4$, $TaCl_5$, $TaOCl_3$, $TaBr_5$, $TaOBr_3$, $NbAcCl_2(OC_2H_5)_2$,

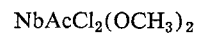
$NbAcCl_2(OCH_3)_2$ $TaAcCl_2(OC_2H_5)_2$ (wherein Ac is an acetylacetone radical). Of the compounds disclosed, it has been found that from a practical standpoint optimum results are obtained by utilizing the vanadium compounds for the preparation of the catalyst. Generally vanadium compounds which are soluble in hydrocarbons are preferred. The vanadium compounds which are soluble in hydrocarbons and are to be employed in preparing the catalyst include the halides and the oxyhalides such as $VOCl_3$, $VCl_4$, $VBr_4$ and such compounds wherein at least one of the metal valences is saturated with a hetero atom, e.g., oxygen or nitrogen which is linked to an organic group. Compounds of this type include for example vanadium triacetylacetonate, vanadium tribenzoylacetonate, vanadyl diacetylacetonate, haloacetylacetonates, vanadyl trialkoxides, haloalkoxides, tetrahydrofuranates, etherates, aminates, pyridinates, and quinolinates of vanadium tri- and tetrachloride and of vanadyl trichloride. In addition, it is possible to use vanadium compounds which are insoluble in hydrocarbons which include the organic salts such as vanadium triacetate, tribenzoate and tristearate.

It has been discovered, however, that in order to obtain the proper results it was essential to carry out the polymerization in the presence of a halogen-containing catalyst. This catalyst can be obtained by mixing a compound of the transition metal of Group V with an organometallic compound or hydride of a metal of Groups I, II and III or with a complex organometallic compound or complex hydride of metals of Groups I and III of the Periodic Table. At least one of the valences of said transition metal and/or at least one of the valences of said metals of Groups I, II and III must be saturated with a halogen atom in order to obtain the satisfactory results.

Thus, in preparing the catalyst all of the above-mentioned organometallic or hydride compounds may be used with halogen-containing transition metal compounds. However, if halogen-free transition metal compounds are used, then it is necessary to use halogen-containing organometallic compounds or hydrides in preparing the catalyst. The presence of a halogen atom in either one of the catalyst components is essential to a satisfactory result. The process of copolymerization can be carried out at temperatures ranging from about $-80°$ C. to $+125°$ C. In instances where the catalysts to be employed are prepared from vanadium triacetylacetonate, vanadyl diacetylacetonate, vanadyl haloacetylacetonates or from any vanadium compound such as $VCl_4$ or $VOCl_3$ in the presence of aluminum alkyl halides it is convenient to carry out both the preparation of the catalyst and the copolymerization at temperatures ranging from about $0°$ C. to $-80°$ C. and preferably between $-10°$ and $-50°$ C. It is important to use these temperatures in order to obtain high yields of copolymer per unit weight of catalyst employed.

When operating under the above conditions, the catalysts display an activity much greater than would be expected from the same catalyst prepared at a higher temperature. Moreover, when operating at the above-mentioned temperature ranges, the activity of the catalyst is constant or remains practically unaltered throughout the polymerization process.

When catalysts are employed which are prepared from vanadium triacetylacetonate, vanadyl trialkoxides, vanadyl haloalkoxides and an aluminum alkylhalide at temperatures ranging from $0°$ C. to $125°$ C., in order to obtain high yields of copolymer it is advantageous to operate in the presence of a complexing agent. These complexing agents include the ethers, thioethers, tertiary amines, and the trisubstituted phosphines containing at least one branched alkyl group or an aromatic nucleus. The ether complexing agents are represented by the formula RYR', wherein Y is oxygen or sulfur and R' represents a linear or branched alkyl group containing from 1 to 14 carbon atoms or an aromatic nucleus containing from 6 to 14 carbon atoms and wherein at least one of the R or R' is a branched alkyl group or an aromatic nucleus.

The tertiary amine complexing agents are represented by the formula

wherein R, R' and R" each represent an alkyl group containing from 1 to 14 carbon atoms or an aromatic nucleus containing 6 to 14 carbon atoms and at least one of the R, R' and R" is an aromatic nucleus.

The tertiary phosphine complexing agents are represented by the formula

wherein R, R' and R" each represent an alkyl radical containing from 1 to 14 carbon atoms or an aromatic nucleus containing from 6 to 14 carbon atoms and at least one of the R, R' and R" is an aromatic nucleus.

The proportion of complexing agent to be utilized in the process is preferably between 0.05 and 1.0 mole per mole of the aluminum alkyl halide. The activity of the catalyst employed in the process will vary according to the molar ratio between the compounds employed in the preparation of the catalyst. Accordingly, it has been found that if aluminum trialkyl and vanadium halides or oxyhalides are used, the catalyst should be prepared by maintaining the molar ratio of the aluminum trialkyl to vanadium compound between 1:1 and 5:1 and more preferably between 2:1 and 4:1. In other words, the aluminum trialkyl may be present in an amount ranging from 1 to 5 moles for every mole of vanadium compound. However, it was found that if aluminum diethyl monochloride $[Al(C_2H_5)_2Cl]$ and vanadium triacetylacetate $(VAc_3)$ were used in preparing the catalyst system, optimum results were obtained by using the $Al(C_2H_5)_2Cl$ to $VAc_3$ in a molar ratio ranging from about 2:1 to 20:1 and more preferably in a molar ratio ranging from about 4:1 to about 10:1.

The copolymerization reaction of this invention should be carried out in the presence of an aliphatic, cycloaliphatic or aromatic hydrocarbon solvent and more specifically in the presence of such solvents as butane, pentane, n-heptane, cyclohexane, toluene, xylene and mixtures thereof. In addition, the halogenated hydrocarbons such as chloroform, trichloroethylene, tetrachloroethylene, chlorobenzene, methylene chloride, etc. can be used as a solvent. It was further discovered that high copolymerization yields could be obtained if copolymerization was carried out in the absence of an inert solvent by employing the monomers in the liquid state. In other words, copolymerization can be carried out in the presence of a solution of ethylene in a mixture of an alpha-olefin and a polycyclic polyene.

In order to obtain copolymers which are substantially homogeneous, it was necessary to keep the ratio between the concentrations of the monomers constant or at least as constant as possible. Thus, it may be advantageous to carry out the copolymerization by continuously feeding and discharging a constant mixture of the monomers and operating at a high spacial velocity.

The composition of the copolymer may be varied substantially by varying the composition of the mixture of monomers. In the case of binary copolymers of ethylene and a polycyclic polyene with condensed nuclei, in order to obtain amorphous products having elastomeric properties it was necessary to regulate the monomeric mixture so as to obtain copolymers having a relatively high polyene content. The polyene content should be preferably higher than 25% by moles. If it is desirable to obtain an amorphous terpolymer of a polycyclic polyene, ethylene and propylene, it is important then to keep ethylene and propylene, in the liquid phase, at a molar ratio lower than 1:4. This ratio corresponds to an ethylene-propylene ratio in the gaseous phase, under normal conditions, lower than or at most equal to 1:1. Molar ratios ranging from about 1:200 and 1:4, in the liquid phase, are however satisfactory. In those examples where butene-1 was employed in place of propylene, the ratio between the ethylene and butene in the liquid phase was lower than or at most equal to 1:20. The composition of the corresponding gaseous phase, under normal conditions was lower or at most equal to 1:1.5. However, the molar ratios in the liquid phase may range from between 1:1000 and 1:20.

By operating under the above-mentioned conditions, amorphous terpolymers can be obtained which contain less than 75% by moles of ethylene. At higher ethylene concentrations, the terpolymers exhibit a polyethylenic type of crystallinity. The lower limit of ethylene to be used in any example is not critical, however, and it is generally preferred that the terpolymer contains at least 5% by moles of ethylene. The higher alpha-olefin content in the amorphous terpolymer may range from a minimum of 5% by moles up to a maximum of about 95% by moles. It is convenient, however, and more particularly for economical reasons to introduce into the terpolymer a diene or polyene in an amount less than 20% by moles. A diene or polyene content ranging from about 0.1 to 20% by moles is preferred.

The copolymers obtained by the process of this invention exhibit properties of unvulcanized elastomers in that they have low initial elastic moduli and a very high elongation at the break. The presence of the unsaturated bonds in the macromolecules, which make up the copolymers, is the reason that they can be vulcanized by methods normally employed for the unsaturated rubbers, e.g., particularly rubber having a low content of unsaturation. The vulcanized products have a high reversible elastic elongation and when reinforced with fillers such as carbon black exhibits good tensile strengths. In addition, petroleum oils and the like may be used as plasticizers or extenders. Of the many oils, the paraffinic and naphthenic oils are preferred, but the aromatic oils may be used with complete satisfaction.

The copolymers obtained in accordance with this invention may be vulcanized to obtain elastomers which can be used advantageously due to their superior mechanical characteristics in various fields where natural and synthetic rubbers are presently being used. Thus, for example, the vulcanized copolymers may be used for the preparation of articles which are required to be shaped, such as tubes, pipes, elastic yarns, tire tubes, and similar objects which require elastomeric properties.

The following examples illustrate the product and method of preparing the copolymers of this invention.

EXAMPLE 1

The reaction apparatus consists of a glass cylinder having a diameter of 5.5 cm. and a capacity of 750 ml., provided with stirrer and inlet and outlet pipes for the gases, immersed in a thermostatic bath at −20° C. The gas inlet pipe reaches the cylinder bottom and ends in a porous diaphragm (diameter 3.5 cm.). 120 ml. anhydrous n-heptane and 10 ml. of 4,7,8,9-tetrahydroindene were introduced into the reactor and held under a nitrogen atmosphere.

Through the gas inlet pipe, a gaseous ethylene-propylene mixture in the molar ratio of 1:8 was introduced and circulated at a rate of 200 N l./h. The catalyst was formed in a 100-ml. flask kept at −20° C. under nitrogen by reacting 2 millimols of vanadium tetrachloride and 5 millimoles of aluminum trihexyl in 30 ml. of anhydrous n-heptane. The catalyst thus formed was siphoned into the reactor by means of nitrogen pressure. Feeding and discharging of the propylene-ethylene mixture was continued at a space velocity of 400 N l./h. After 4 minutes from the beginning, the reaction was stopped by adding 20 cc. of methanol containing 0.1 g. of phenyl-β-naphthyl amine. The product was purified in a separating funnel under nitrogen by repeated treatments with aqueous hydrochloric acid and then with water. The product was then coagulated with acetone. After drying under a vacuum, 8.5 g. of solid product were obtained, which appeared to be amorphous by X-rays examination, looked like an unvulcanized elastomer and was completely soluble in boiling n-heptane.

The infrared spectrographic examination showed the presence of double bonds (band at 6.17 microns), of methyl groups (band at 7.25 microns) and of methylene sequences of a different length (bands between 13.3 and 13.8 microns).

100 parts by weight of the ethylene-propylene-tetrahydroindene copolymer were mixed on a laboratory roll mixer, with 1 part of phenyl-β-naphthylamine, 2 parts of sulfur, 5 parts of zinc oxide, 1 part of tetramethylthiuram disulphide and 0.5 part of mercaptobenzothiazole. This mixture was vulcanized in a press for 60 minutes at 150° C. A vulcanized sheet having the following characteristics was obtained:

Tensile strength: 40 kg./cm.²
Elongation at break: 670%
Modulus at 300%: 20 kg./cm.²
Permanent set at break: 10%

EXAMPLE 2

Into the reaction apparatus described in Example 1 held at −20° C., 120 ml. of anhydrous n-heptane and 10 ml. of 4,7,8,9-tetrahydroindene were introduced. Through the gas inlet tube, a gaseous propylene-ethylene mixture having a molar ratio of 8:1 was introduced and circulated at the rate of 200 N l./h.

In a 100 ml. flask, kept under nitrogen, the catalyst was preformed at −20° C., by reacting, in 30 ml. of anhydrous toluene 2.8 millimols of vanadium triacetylacetonate and 14 millimols of aluminum diethyl monochloride. The catalyst was siphoned into the reactor by means of nitrogen pressure. The propylene-ethylene mixture was continuously fed and discharged at the rate of 400 N l./h.

About 15 minutes after starting, the reaction was stopped by adding 20 ml. of methanol containing 0.1 g. of phenyl-beta-naphthylamine. The copolymer was purified and isolated as described in Example 1. After vacuum drying, 9 g. of solid product were obtained which was amorphous by X-rays, appeared like an unvulcanized elastomer and was completely soluble in boiling n-heptane.

The infrared spectrographic examination showed the presence of unsaturations (band at 6.17 microns), of methyl groups (band at 7.15 microns) and of methylene sequences of various lengths (bands between 13.3 and 13.8 microns).

The terpolymer was vulcanized with the same mixture and under the same conditions of Example 1. A vulcanized sheet showing the following characteristics was obtained:

Tensile strength: 17 kg./cm.²
Elongation at break: 320%
Modulus at 300%: 15.5 kg./cm.²
Permanent set at break: 2%

If, in addition to the ingredients mentioned in Example 1, 50 parts by weight of HAF carbon black are added and vulcanization was carried out under the conditions of Example 1. A vulcanized sheet was obtained, having the following characteristics:

Tensile strength: 114 kg./cm.²
Elongation at break: 220%
Modulus at 100%: 34.5 kg./cm.²
Permanent set at break: 4%

EXAMPLE 3

Into the same reaction apparatus as described in Example 1, kept at −20° C., 120 ml. of anhydrous n-heptane and 5 ml. of 4,7,8,9-tetrahydroindene were introduced. Through the gas inlet tube a gaseous propylene-ethylene mixture in the molar ratio of 4:1, was introduced and circulated at the rate of 200 N l./h. In a 100 ml. flask the catalyst was preformed at −20° C. under nitrogen by reacting, in 30 ml. of anhydrous toluene, 2.8 millimols of vanadium triacetylacetonate and 14 millimoles of aluminum diethylmonochloride.

The catalyst was siphoned into the reactor by means of nitrogen pressure. The propylene-ethylene mixture was continuously fed and discharged at the rate of 400 N l./h. About 5 minutes and 30 seconds after starting, the reaction was stopped by adding 20 ml. of methanol containing 0.1 g. of phenyl-beta-naphthylamine.

The product was purified and isolated as described in Example 1. After vacuum drying, 7.9 g. of solid product was obtained, which was amorphous under X-rays examination, appeared like an unvulcanized elastomer and was completely soluble in boiling n-heptane. The infrared spectrographic examination showed the presence of double bonds (band at 6.17 microns). The ethylene/propylene molar ratio was about 1:1.

The ethylene-propylene-tetrahydroindene terpolymer was vulcanized with the mixture and the modalities of Example 1.

A vulcanized sheet was obtained, having the following characteristics:

Tensile strength: 13.2 kg./cm.$^2$
Elongation at break: 320%
Modulus at 300%: 11.5 kg./cm.$^2$
Permanent set at break: 2%

EXAMPLE 4

Into the same reaction apparatus as described in Example 1, kept at —20° C., 350 ml. of anhydrous n-heptane and 2.5 ml. of 4,7,8,9-tetrahydroindene were introduced.

Through the gas inlet tube a gaseous ethylene-propylene mixture, in the molar ratio of 1:2 was introduced and circulated at the rate of 200 N l./h. In a 100 ml. flask, the catalyst was preformed at —20° C. under nitrogen atmosphere, by reacting in 30 ml. of anhydrous n-heptane 0.5 millimol of vanadium tetrachloride and 2.5 millimoles of aluminum diethyl monochloride. The catalyst was siphoned into the reactor by means of nitrogen pressure. The gaseous ethylene-propylene mixture was continuously fed and discharged at the rate of 400 N l./h.

Two minutes and 30 seconds after starting, the reaction was stopped by adding 20 ml. of methanol containing 0.1 g. of phenyl beta-naphthylamine. The product was purified and isolated as described in Example 1.

After vacuum drying, a solid product was obtained which was amorphous by X-rays, appeared like a non-vulcanized elastomer and was completely soluble in boiling n-heptane.

The infrared spectrographic examination showed the presence of unsaturations (band at 6 microns). The ethylene-propylene molar ratio was about 1:1. The ethylene-propylene-tetrahydroindene terpolymer was vulcanized with the same mixture and modalities as in Example 1.

A vulcanized sheet was obtained, having the following characteristics:

Tensile strength: 45 kg./cm.$^2$
Elongation at break: 380%
Modulus at 300%: 15 kg./cm.$^2$
Permanent set at break: 6%

EXAMPLE 5

Into the same reaction apparatus described in Example 1, 350 ml. of anhydrous n-heptane and 1.5 ml. of 4,7,8,9-tetrahydroindene were introduced.

Through the gas inlet tube a gaseous ethylene-propylene mixture in the molar ratio of 1:4 was introduced into the apparatus held at room temperature and was circulated at the rate of 200 N l./h. In a 100 ml. flask the catalyst was preformed by operating at room temperature under nitrogen and by reacting 1 millimole of vanadium tetrachloride and 5 millimoles of aluminum diethyl-monochloride in 30 ml. of anhydrous n-heptane.

The catalyst was siphoned into the reactor by means of nitrogen pressure. The ethylene-propylene mixture was continuously fed and discharged at a rate of 400 N l./h. After 15 minutes from the beginning the reaction was stopped by adding 20 ml. of methanol containing 0.1 g. phenyl-beta-naphthylamine.

The product was purified and isolated as described in Example 1.

After vacuum drying, 4 g. of a solid product were obtained which was amorphous under X-ray examination, was completely soluble in boiling n-heptane and appeared like a non-vulcanized elastomer.

The infrared spectrographic examination showed the presence of unsaturations (band at 6 microns). The ethylene-propylene-tetrahydroindene terpolymer was vulcanized by adopting the mixture and the modalities of Example 1.

A vulcanized sheet having the following characteristics was obtained:

Tensile strength: 47.5 kg./cm.$^2$
Elongation at break: 560%
Modulus at 300%: 14 kg./cm.$^2$

EXAMPLE 6

The following substances were introduced in the following order into a 250 cc. test tube:

0.8 g. of NbCl$_5$ (2.8 millimols),
20 cc. of toluene,
80 cc. of n-heptane, and
1.8 cc. of Al(C$_2$H$_5$)$_2$Cl (14 millimols).

The whole was siphoned into a 1-liter autoclave and 10 cc. of bicyclo [4,3,0] nonadiene-3,7, 75 g. of propylene and 6 g. of ethylene were successively introduced. The autoclave was agitated at room temperature for 10 hours. The polymer was purified as described in Example 1.

After vacuum drying, 7 g. of solid product were obtained which was amorphous under X-ray examination, loked like a non-vulcanized elastomer and was completely soluble in boiling n-heptane.

The infrared spectrographic examination showed the presence of unsaturations (band at 6.17 microns), methyl groups (band at 7.25) and methylenic sequences of various lengths (zone comprised between 13 and 14 microns).

EXAMPLE 7

The reaction apparatus was similar to that described in Example 1 but had a diameter of 7.5 cm. and a capacity of 1000 cc. Into the apparatus held at —20° C., 700 cc. of anhydrous n-heptane and 6 cc. of 4,7,8,9-tetrahydroindene (bicyclo [4,3,0] nonadiene 3,7) were introduced.

Through the gas inlet tube, a gaseous propylene-ethylene mixture having a molar ratio of 4:1 was introduced and circulated at the rate of 400 N l./h.

A gaseous hydrogen current was introduced contemporaneously and was circulated at the flow-rate of 7.5 N liters/hour.

In a 100 ml. flask, kept under nitrogen, the catalyst was preformed at —20° C., by reacting, in 35 ml. of anhydrous n-heptane, 0.5 millimol of vanadium tetrachloride and 2.5 millimols of aluminum diethyl monochloride. The catalyst was siphoned into the reactor by means of nitrogen pressure. The gaseous propylene/ethylene-hydrogen mixture was continuously fed and discharged at the rate of 400 N l./h.

About 40 minutes after starting, the reaction was stopped by adding 20 ml. of methanol containing 0.1 g. of phenyl-beta-naphthylamine.

The product was purified and isolated as described in Example 1. After vacuum drying, 32 g. of solid product were obtained which was amorphous under X-ray examination, looked like a non-vulcanized elastomer and was completely soluble in boiling n-heptane.

The infrared spectrographic examination showed the presence of unsaturations (band at 6.17 microns). The Mooney viscosity (ML 1+4) at 100° C. was 33.

The terpolymer was vulcanized with the same mixture and conditions of Example 1, but with the addition of 50 parts by weight of HAF carbon black. A vulcanized sheet having the following characteristics was obtained:

Tensile strength: 185 kg./cm.$^2$
Elongation at break: 420%
Modulus at 300%: 12 kg./cm.$^2$
Permanent set at break: 8%

EXAMPLE 8

The reaction apparatus was similar to that of Example 1 but had a diameter of 7.5 cm. and a capacity of 1000 cc. Into the apparatus kept at —20° C., 700 cc. of anhydrous n-heptane and 0.5 cc. of bicyclo [3,2,0] heptadiene 2–6 were introduced. Through the gas inlet tube, a gaseous propylene-ethylene mixture in the molar ratio of 4:1 was troduced and circulated at the rate of 250 N l./h. In a 100 cc. flask, the catalyst was preformed at —20° C. under nitrogen by reacting in 30 cc. of anhydrous n-heptane 0.5 millimol of vanadium tetrachlroide and 2.5 millimoles of aluminum diethylmonocholride.

The catalyst was siphoned into the reactor by means of nitrogen pressure. The propylene-ethylene mixture was continuously fed and discharged at the rate of 500 N l./h.

About 6 minutes after the introduction of the catalyst, the reaction was stopped by adding 20 cc. of methanol containing 0.1 g. of phenyl-beta-naphthylamine. The product was purified and isolated as described in Example 1. After vacuum drying, 9 g. of solid product was obtained which was amorphous under X-ray examination, looked like a non-vulcanized elastomer and was completely soluble in boiling n-heptane.

The infrared spectrographic examination showed the presence of unsaturations (band at betwen 6 and 6.5 microns). The ethylene-propylene-bicyclo heptadiene terpolymer was vulcanized with the mixture and the modalities of Example 1.

A vulcanized sheet was obtained, having the following characteristics:

Tensile strength: 21 kg./cm.$^2$
Elongation at break: 380%
Modulus at 300%: 144 kg./cm.$^2$
Permanent set at break: 4%

In addition to the ingredients listed in Example 1, 50 parts by weight of HAF carbon black were also used and the vulcanization was carried out with the modalities described in Example 1. A vulcanized lamina having the following characteristics was obtained.

Tensile strength: 219 kg./cm.$^2$
Elongation at break: 440%
Modulus at 300%: 144 kg./cm.$^2$
Permanent set at break: 8.5%

EXAMPLE 9

Into the same reaction apparatus described in Example 8, kept at —10° C., 700 cc. of anhydrous n-heptane and 0.5 cc. of bicyclo-[3,2,0]heptadiene 2,6 were introduced. Through the gas inlet tube, a gaseous ethylene-butene-1 mixture, in the molar ratio of 1:5 was introduced and circulated at the rate of 200 N. l./h. In a 100 cc. flask, the catalyst was preformed at —10° C. under nitrogen atmosphere, by reacting in 30 cc. of anhydrous n-heptane, 0.5 millimol of vanadium tetrachloride and 2.5 millimols of aluminum diethyl monochloride.

The catalyst was siphoned into the reactor by means of nitrogen pressure. The gaseous mixture was continuously fed and discharged at the rate of 400 N l./h. Six minutes after the introduction of the catalyst the reaction was stopped by adding 10 cc. of methanol containing 0.1 g. of phenyl beta-naphthylamine. The product was purified and isolated as described in Example 1.

After vacuum drying, 7 g. of solid product were obtained which was amorphous under X-ray examination, looked like a non-vulcanized elastomer and was completely soluble in boiling n-heptane.

The infrared spectrographic examination showed the presence of unsaturations (band at betwen 6 and 6.5 microns). The product was vulcanized with the same mixture and modalities as in Example 1.

A vulcanized sheet was obtained, having the following characteristics:

Tensile strength: 28 kg./cm.$^2$
Elongation at break: 400%
Modulus at 300%: 13 kg./cm.$^2$

EXAMPLE 10

Into the reaction apparatus described in Example 8, kept at —20° C., 700 cc. of anhydrous n-heptane and 7 cc. of 3-methyl-bicyclo [4,3,0] nonadiene 3–7, were introduced. Through the gas inlet tube, a gaseous ethylene-propylene mixture in the molar ratio of 1:4 was introduced, circulated at the rate of 400 N l./h. In a 100 cc. flask the catalyst was preformed by operating at —20° C. under nitrogen and by reacting 0.5 millimol of vanadium tetrachloride and 2.5 millimols of aluminum diethylmonochloride in 30 cc. of anhydrous n-heptane.

The catalyst was siphoned into the reactor by means of nitrogen pressure. The gaseous mixture was continuously fed and discharged at a rate of 400 N l./h. About 10 minutes after the introduction of the catalyst, the reaction was stopped by adding 10 cc. of methanol containing 0.1 g. phenyl-beta-naphthylamine.

The product was purified and isolated as described in Example 1.

After vacuum drying, 20 g. of a solid product was obtained which was amorphous under X-ray examination, was completely soluble in boiling n-heptane and looked like a non-vulcanized elastomer.

The terpolymer was vulcanized with the aid of the mixture of Example 1, with the addition of 50 parts by weight of HAF carbon black.

A vulcanized sheet having the following characteristics was obtained:

Tensile strength: 180 kg./cm.$^2$
Elongation at break: 380%
Modulus at 300%: 143 kg./cm.$^2$

EXAMPLE 11

Into the reaction apparatus described in Example 8, kept at —20° C., 700 cc. of anhydrous n-heptane and 0.5 cc. of bicyclo [4,2,0] octadiene 3–7 were introduced. Through the gas inlet tube a propylene-ethylene mixture in the molar ratio of 4:1 was introduced and circulated at the flow-rate of 400 N liters/hour. In a 100 cc. flask the catalyst was preformed at —20° C. under nitrogen by reacting, in 30 cc. of anhydrous n-heptane, 0.5 millimol of vanadium tetrachloride with 2.5 millimols of aluminum diethyl monochloride. The catalyst was siphoned into the reactor by means of nitrogen pressure. The ethylene-propylene mixture was continuously fed and discharged at the flow-rate of 500 N l./h. After 5 minutes from the beginning, the reaction was stopped by adding 20 cc. of methanol containing 0.1 g. of phenyl-beta-naphthylamine. The product was purified and isolated as described in Example 1.

After vacuum drying, 7 g. of a solid product were obtained which was amorphous under X-ray examination, looked like a non-vulcanized elastomer and was completely soluble in boiling n-heptane.

The product was vulcanized with the mixture and modalities of Example 10. A vulcanized lamina having the following characteristics was obtained:

Tensile strength: 200 kg./cm.$^2$
Elongation at break: 420%
Modulus at 300%: 160 kg./cm.$^2$

EXAMPLE 12

Into the reaction apparatus described in Example 1 kept at —20° C., 700 cc. of anhydrous n-heptane and 5 cc. of tetrahydropentalene (bicyclo [3,3,0] octadiene 2–6) were introduced.

Through the gas inlet tube a propylene-ethylene mixture in the molar ratio of 4:1 was introduced and circulated at the flow-rate of 500 N l./h. In a 100 cc. flask the catalyst was preformed at —20° C. under nitrogen by reacting 0.5 millimol of vanadium tetrachloride and 2.5 millimols of aluminum diethyl monochloride in 30 cc. of anhydrous n-heptane. The catalyst was siphoned into the reactor under nitrogen pressure. The ethylene-propylene mixture was continuously fed and discharged at the flow-rate of 500 N l./h. After 6 minutes, the reaction was stopped by addition of 10 cc. of methanol containing 0.1 g. of phenyl beta napthylamine.

The product was purified and isolated as described in Example 1. After vacuum drying 18 g. of a solid product were obtained which was amorphous under X-rays examination, looked like a non-vulcanized elastomer and was completely soluble in boiling n-heptane.

It was vulcanized with the mixture and the modalities of Example 10. A vulcanized lamina having the following characteristics was obtained:

Tensile strength: 160 kg./cm.$^2$
Elongation at break: 410%
Modulus at 300%: 135 kg./cm.$^2$

EXAMPLE 13

In the reaction apparatus described in Example 1, kept at −20° C., 350 cc. of anhydrous n-heptane and 3 cc. of bicyclo [4,3,0] nonadiene 3–7 were introduced. Through the gas inlet tube a propylene-ethylene mixture in the molar ratio of 4:1 was introduced and circulated at the flow-rate of 500 N l./h.

In a 100 cc. flask the catalyst was preformed at −20° C. under nitrogen by reacting 0.5 millimol of vanadium tetrachloride and 1.25 millimols of 2-methyl-1,4-di (diisobutylaluminum) butane in 30 cc. of anyhdrous n-heptane. The catalyst was siphoned into the reactor under nitrogen pressure. The ethylene-propylene mixture was continuously fed and discharged at the flow-rate of 500 N l./h. After 6 minutes, the reaction was stopped by adding 10 cc. of methanol containing 0.1 g. of phenyl-beta-naphthylamine. The product was purified and isolated as described in Example 1.

After vacuum drying, 7 g. of a solid product were obtained which appeared to be amorphous under X-ray examination, looked like a non-vulcanized elastomer and was completely soluble in boiling n-heptane.

The infrared spectrographic examination showed the presence of unsaturations. The ethylene-propylene-bicyclononadiene terpolymer was vulcanized with the mixture and the modalities of Example 1.

A vulcanized lamina having the following characteristics was obtained:

Tensile strength: 36 kg./cm.$^2$
Modulus at 300%: 13 kg./cm.$^2$
Elongation at break: 450%

EXAMPLE 14

250 cc. of anhydrous n-heptane and 3 cc. of bicyclo [4,3,0] nonadiene 3–7 were introduced into the reaction apparatus described in Example 1, and held at −20° C.

Through the gas inlet pipe, a propylene-ethylene mixture in the molar ratio 4:1 was introduced and circulated at a rate of 300 N l./h. The catalyst was preformed in a 100 cc. flask kept at −20° C. under nitrogen by reacting 4 millimols of vanadium tetrachloride and 3 millimols of beryllium diethyl in 30 cc. of anhydrous n-heptane. The catalyst thus formed was siphoned into the reactor by means of nitrogen pressure. The propylene-ethylene mixture was continuously fed and discharged at the flow-rate of 300 N l./h. After 5 minutes from the beginning, the reaction was stopped by adding 10 cc. of methanol containing 0.1 g. of phenyl-beta-naphthylamine. The product was purified and isolated as described in Example 1.

After drying under vacuum, 7 g. of a solid product were obtained which appeared to be amorphous under X-ray examination, looked like a non-vulcanized elastomer and was completely soluble in boiling n-heptane.

The infrared spectrographic examination showed the presence of unsaturations (band at 6.17 microns). The ethylene-propylene molar ratio was approximately 1:1.

EXAMPLE 15

Into the reaction apparatus described in Example 8 and kept at −20° C., 700 cc. of anhydrous n-heptane and 6 cc. of bicyclo [4,3,0] nonadiene 3–7 were introduced.

Through the gas inlet tube, a gaseous propylene-ethylene mixture having a molar ratio of 4:1 was introduced and circulated at the flow-rate of 250 N l./h.

In a 100 cc. flask kept under nitrogen, the catalyst was preformed at −20° C., by reacting, in 30 cc. of anhydrous n-heptane, 1 millimole of VOCl$_3$ and 5 millimols of aluminum diethyl monochloride. The catalyst was siphoned into the reactor by means of nitrogen pressure. The propylene-ethylene mixture was continuously fed and discharged at the flow-rate of 500 N l./h.

After 10 minutes, the reaction was stopped by adding 10 cc. of methanol containing 0.1 g. of phenyl-beta-naphthylamine. The product was purified and isolated as described in Example 1. After vacuum drying, 22 g. of a solid product was obtained which was amorphous under X-rays examination, looked like a non-vulcanized elastomer and was completely soluble in boiling n-heptane.

The infrared spectographic examination showed the presence of unsaturations (band at 6.17 microns). The ethylene-propylene molar ratio was about 1:1.

The product was vulcanized with the same mixture and conditions of Example 1. A vulcanized sheet showing the following characteristics was obtained:

Tensile strength: 32 kg./cm.$^2$
Elongation at break: 460%
Modulus at 300%: 12 kg./cm.$^2$

EXAMPLE 16

Into the reaction apparatus described in Example 1, kept at −20° C., 350 cc. of anhydrous n-heptane and 3 cc. of bicyclo [4,3,0] nonadiene 3–7 were introduced. Through the glas inlet tube, a gaseous propylene-ethylene mixture in the molar ratio of 4:1 was introduced and circulated at the flow-rate of 250 N l./h.

In a 100 ml. flask, the catalyst was preformed at −20° C., under nitrogen by reacting, in 30 ml. of anhydrous toluene, 1.4 millimols of vanadium trichloride tetrahydrofuranate and 7 millimoles of aluminum diethylmonochloride.

The catalyst was siphoned into the reactor by means of nitrogen pressure. The propylene-ethylene mixture was continuously fed and discharged at the rate 250 N l./h. About 30 minutes after starting, the reaction was stopped by adding 10 cc. of methanol containing 0.1 g. of phenyl-beta-naphthylamine.

The product was purified and isolated as described in Example 1. After vacuum drying, 8 g. of a solid product was obtained which was amorphous under X-ray examination, looked like a non-vulcanized elastomer and was completely soluble in boiling n-heptane.

The infrared spectrographic examination showed the presence of unsaturations (band at 6.17 microns). The ethylene/propylene molar ratio was about 1:1.

EXAMPLE 17

Into a 100 cc. three-necked flask provided with an agitator and kept at −20° C., 20 cc. of bicyclo [4,3,0] nonadiene 3–7 were introduced. A gaseous mixture of radioactive ethylene and nitrogen (2 g. ethylene diluted with 200 g. of N$_2$) was bubbled and circulated at the rate of 30 N l./h. In a 100 cc. flask, the catalyst was preformed at −20° C. under nitrogen atmosphere, by reacting in 20 cc. of anhydrous n-heptane, 2 millimols of vanadium tetrachloride and 10 millimols of aluminum diethyl monochloride.

The catalyst was siphoned into the reactor by means of nitrogen pressure. The mixture of radioactive ethylene and nitrogen was continuously fed and discharged at the flow-rate of 30 N l./h.

Five hours after starting, the reaction was stopped by adding 10 cc., of methanol containing 0.1 g. of phenyl beta-naphthylamine. The product was purified and isolated as described in Example 1. After vacuum drying, 1.8 g. of a solid product was obtained which was amorphous under X-rays examination and was completely soluble in boiling n-heptane.

The infrared spectographic examination showed the presence of 24.8% of ethylene by weight (58.6% by mols). The X-ray examination showed a wide band characteristic of an amorphous product.

EXAMPLE 18

Into the reaction apparatus described in Example 1, kept at −10° C., 700 cc. of anhydrous n-heptane and 6 cc. of bicyclo[4,3,0]nonadiene 3-7 were introduced. Through the gas inlet tube a gaseous ethylene-propylene butene-1 mixture in the molar ratio of 1:2:2 was introduced and circulated at the flow-rate of 200 N l./h.

In a 100 cc. flask the catalyst was preformed at −20° C. under nitrogen by reacting 1 millimole of vanadium tetrachloride and 5 millimoles of aluminum diethyl-monochloride in 30 cc. of anhydrous n-heptane.

The catalyst was siphoned into the reactor by means of nitrogen pressure. The gaseous mixture was continuously fed and discharged at the flow-rate of 400 N l./h. After 8 minutes from the beginning, the reaction was stopped by adding 10 cc. of methanol containing 0.1 g. of phenyl-beta-naphthylamine. The product was purified and isolated as described in Example 1. After vacuum drying, 10 g. of a solid product were obtained which was amorphous under X-ray examination, completely soluble in boiling n-heptane and looked like a non-vulcanized elastomer.

The infrared spectrographic examination showed the presence of unsaturations (band at 6.17 microns), of methylenic sequences of various lengths (zone between 13 and 14 microns), of methyl groups (band at 7.25 microns) and of ethyl groups (band at 12.95–13 microns) in an amount corresponding to about 50% of the amount of the methyl group.

EXAMPLE 19

700 cc. of anhydrous n-heptane and 6 cc. of bicyclo [4,3,0]nonadiene 3-7 were introduced into the reaction apparatus described in Example 1 and kept at −20° C. Through the gas inlet tube a gaseous ethylene-propylene mixture in the molar ratio 1:4 was introduced and circulated at the flow-rate of 250 N l./h. The catalyst was formed in a 100 cc. flask at −20° C. under nitrogen by reacting 1 millimole of vanadium tetrachloride and 5 millimoles of aluminum diethyl-monochloride in 30 cc. of anhydrous n-heptane. The catalyst was siphoned into the reactor by means of nitrogen pressure. The propylene-ethylene mixture was continuously fed and discharged at the flow-rate of 400 N l./h. After 7 minutes, the reaction was stopped by adding 10 cc. of methanol containing 0.1 g. of phenyl-beta-naphthylamine. The product was purified and isolated as described in Example 1.

After drying under vacuum, 20 g. of a solid product were obtained which appeared to be amorphous under X-rays examination, looked like a non-vulcanized elastomer and was completely soluble in boiling n-heptane.

The infrared spectrographic examination showed the presence of unsaturations (band at 6.17 microns). The ethylene-propylene molar ratio was about 1:1.

The product was vulcanized with the mixture and the modalities of Examples 1. A vulcanized sheet having the following characteristics was obtained:

Tensile strength: 34 kg./cm.$^2$
Elongation at break: 450%
Modulus at 300%: 13 kg./cm.$^2$

EXAMPLE 20

Into the reaction apparatus described in Example 8, kept at −20° C., 700 cc. of anhydrous n-heptane and 0.5 cc. of bicyclo[3,2,0]heptadiene 2-6 were introduced.

Through the gas inlet tube, a gaseous propylene-ethylene mixture having a molar ratio of 6:1 was introduced and circulated at the rate of 470 N l./h.

In a 100 cc. flask, kept under nitrogen, the catalyst was preformed at −20° C., under nitrogen by reacting, in 30 cc. of anhydrous toluene, 1.4 millimols of vanadium triacetylacetonate and 7 millimols of aluminum diethyl monochloride. The catalyst thus preformed was kept at −20° C. for 5 minutes and then siphoned into the reactor by means of nitrogen pressure. The propylene-ethylene mixture was continuously fed and discharged at the rate of 470 N l./h.

After 5 minutes, the reaction was stopped by adding 10 cc. of methanol containing 0.1 g. of phenyl-beta-naphthylamine. The product was purified and isolated as described in Example 1. After vacuum drying, 4 g. of a solid product were obtained which was amorphous under X-rays examination, looked like a non-vulcanized elastomer and was completely soluble in boiling n-heptane.

The infrared spectrographic examination showed the presence of unsaturations (band between 6 and 6.5 microns). The ethylene-propylene molar ratio was about 1:1.

The terpolymer was vulcanized with the same mixture and conditions of Example 10. A vulcanized lamina showing the following characteristics was obtained:

Tensile strength: 196 kg./cm.$^2$
Elongation at break: 380%
Modulus at 300%: 153 kg./cm.$^2$
Permanent set at break: 12%

EXAMPLE 21

Into the reaction apparatus described in Example 8, kept at −20° C., 700 cc. of anhydrous n-heptane and 0.5 cc. of bicyclo[3,2,0]heptadiene 2-6 were introduced.

Through the gas inlet tube a gaseous ethylene-propylene mixture in the molar ratio of 1:2 was introduced and circulated at the rate 600 N l./h. In a 100 cc. flask, the catalyst was preformed at −20° C. under nitrogen atmosphere, by reacting, in 30 cc. of anhydrous n-heptane, 0.5 millimol of vanadium tetrachloride and 2.5 millimoles of aluminum diethyl sesquichloride. The catalyst thus preformed was siphoned into the reactor by means of nitrogen pressure. The ethylene-propylene mixture was continuously fed and discharged at the rate of 600 N l./h.

After 2 minutes the reaction was stopped by adding 10 cc. of methanol containing 0.1 g. of phenyl-beta-naphthylamine. The product was purified and isolated as described in Example 1.

After vacuum drying, 8 g. of solid product were obtained which was amorphous under X-ray examination, looked like a non-vulcanized elastomer and was completely soluble in boiling n-heptane.

The infrared spectrographic examination showed the presence of unsaturations (zone between 6 and 6.5 microns) of methyl groups (band at 7.25 microns) and of methylenic sequences of various lengths (zone between 13 and 14 microns).

The product was vulcanized with the same mixture and modalities of Example 1. A vulcanized lamina was obtained, having the following characteristics:

Tensile strength: 240 kg./cm.$^2$
Elongation at break: 380%
Modulus at 300%: 195 kg./cm.$^2$
Permanent set at break: 4%

EXAMPLE 23

700 cc. of anhydrous n-heptane and 0.5 cc. of bicyclo [3,2,0] heptadiene 2,6 were introduced into the same reaction apparatus of Example 4, and kept at −20° C. Through the gas inlet tube a gaseous propylene-ethylene mixture in the molar ratio 4:1 was introduced and circulated at a rate of 250 N l./h.

The catalyst was preformed in a 100 cc. flask under nitrogen atmosphere, at −20° C., by reacting in 30 cc. of anhydrous n-heptane 0.5 millimol of vanadium tetrachloride and 2.5 millimols of aluminum diisobutylmonohydride. The preformed catalyst was siphoned into the reactor by means of nitrogen pressure. The ethylene-propylene mixture was continuously fed and discharged at a rate of 500 N l./h. About 6 minutes after the catalyst introduction, the reaction was stopped by adding 20 cc. of methanol containing 0.1 g. of phenyl-beta-naphthylamine.

The product was purified and isolated as described in Example 1. After vacuum drying, 8 g. of solid product was obtained which was amorphous under X-ray examination, looked like a non-vulcanized elastomer and was completely soluble in boiling n-heptane.

Spectrographic infrared examination showed the presence of unsaturations (bands comprised between 6 and 6.5 microns). The ethylene-propylene molar ratio was about 1:1. The ethylene-propylene-bicyclo-heptadiene terpolymer was vulcanized with the same mixture and the same modalities of Example 1. A vulcanized lamina having the following characteristics was obtained:

Tensile strength: 29 kg./cm.$^2$
Elongation at break: 450%
Modulus at 300%: 13 kg./cm.$^2$

EXAMPLE 24

700 cc. of anhydrous n-heptane and 6 cc. of bicyclo [4,3,0]-nonadiene 3,7 were introduced into the same apparatus of Example 4 and kept at −20° C. Through the gas inlet tube, a gaseous propylene-ethylene mixture in the molar ratio 4:1 was introduced and circulated at a rate of 250 N l./h.

The catalyst was preformed in a 100 cc. flask under nitrogen atmosphere at −20° C., by reacting in 30 cc. of anhydrous n-heptane 0.5 millimol of vanadium tetrachloride and 2.5 millimols of aluminumdiethylmonohydride. The prepared catalyst was siphoned into the reactor by means of nitrogen pressure. The ethylene-propylene mixture was continuously fed and discharged at a rate of 500 N l./h.

About 7 minutes after the introduction of the catalyst, the reaction was stopped by adding 20 cc. of methanol containing 0.1 g. of phenyl-beta-naphthylamine.

The product was purified and isolated as described in Example 1. After vacuum drying, 18 g. of solid product were obtained which was amorphous under X-rays examination and looked like a non-vulcanized elastomer. The product was completely soluble in boiling n-heptane.

Spectrographic infrared examination revealed the presence of double bonds (band at about 6 microns). The ethylene-propylene molar ratio was about 1:1.

The ethylene-propylene - dicyclononadiene terpolymer was vulcanized with the same mixture and the same modalities of Example 1. A vulcanized lamina having the following characteristics was obtained:

Tensile strength: 32 kg./cm.$^2$
Elongation at break: 420%
Modulus at 300%: 13 kg./cm.$^2$ While this invention has been described with respect to a number of specific examples, it is obvious that other modifications and variations may be resorted to without departing from the spirit of the invention except as recited in the appended claims.

What is claimed is:

1. A high molecular weight, linear, amorphous copolymer of at least one polycyclic hydrocarbon polyene selected from the group consisting of bicyclo[4,3,0]nonadiene 3–7 (4,7,8,9 tetrahydroindene)
bicyclo[4,3,0]nonadiene 2–8 (6,7,8,9 tetrahydroindene)
bicyclo[4,3,0]nonadiene 2–7 (4,5,8,9 tetrahydroindene)
bicyclo[5,5,0]dodecadiene 2–7 (8)
bicyclo[4,2,0]octadiene 3–7
bicyclo[3,2,0]heptadiene 2,6
tricyclo[4,2,00$^{2-5}$]octadiene 3–7
bicyclo[3,3,0]octadiene 2,6 (1,4,7,8-tetrahydropentalene)
bicyclo[4,3,0]nonatriene 2,4,7 (8,9 dihydroindene)
2,3,4,5 tetraphenyl bicyclo[4,3,0]nonatriene 2,4,7 (4,5,6,7 tetraphenyl-8,9-dihydroindene)
bicyclo[5,1,0]octadiene 2,5 (3,4-homotropylidene)
bicyclo[4,2,0]octadiene 2,7
tricyclo[5,3,0,0$^{2-6}$]decadiene 3,9
tetraphenyl 1,7,8,9 tricyclo[5,2,0,0$^{2-6}$]nonadiene 3,8 and at least one monomer selected from the group consisting of ethylene and higher alpha-olefins of the general formula R—CH$_2$=CH$_2$, wherein R is an alkyl group containing from 1 to 6 carbon atoms; said copolymer containing from about 0.1% to about 20% by moles of polyene, comprising macromolecules containing unsaturations, and consisting of polymerized units originating from each of the monomers.

2. The high molecular weight, linear, amorphous copolymer of claim 1, further characterized in that the alpha-olefins are ethylene, propylene, and butene-1.

3. The high molecular weight, linear, amorphous copolymers of claim 2, further characterized in that the polycyclic polyene is bicyclo(4,3,0)nonadiene 3–7.

4. The high molecular weight, linear, amorphous copolymer of claim 2, further characterized in that the polycyclic polyene is bicyclo(3,2,0)heptadiene 2–6.

5. The high molecular weight, linear, amorphous copolymer of claim 2, further characterized in that the polycyclic polyene is bicyclo(4,2,0)octadiene 3–7.

6. The high molecular weight, linear, amorphous copolymer of claim 2, further characterized in that the polycyclic polyene is bicyclo(3,3,0)octadiene 2–6.

7. The high molecular weight, linear, amorphous copolymers of claim 1, further characterized in that at least one of the olefins is ethylene.

8. The high molecular weight, linear, amorphous copolymers of claim 1, further characterized in that at least one of the higher alpha-olefins is propylene.

9. The high molecular weight, linear, amorphous copolymers of claim 1, further characterized in that at least one of the higher alpha-olefins is butene-1.

10. The high molecular weight, linear, amorphous copolymers of claim 1, further characterized in that the polycyclic polyene is bicyclo(4,3,0)nonadiene 2–8.

11. The high molecular weight, linear, amorphous copolymers of claim 1, further characterized in that the polycyclic polyene is 2,3,4,5 tetraphenylbicyclo(4,3,0) nonatriene.

12. The high molecular weight, linear, amorphous copolymer of claim 1, further characterized in that the polycyclic polyene is 2,4,7 (4,5,6,7 tetraphenyl-8,9-dihydroindene).

13. The high molecular weight, linear, amorphous copolymers of claim 1, further characterized in that the polycyclic polyene is tetraphenyl 1,7,8,9 tricyclo(5,2,0,0$^{2-6}$) nonadiene 3,8.

14. A copolymer according to claim 1, sulfur-vulcanized to an elastomer.

15. An amorphous hydrocarbon terpolymer consisting of monomeric units originating from ethylene, one other alpha-olefin containing from 3–8 carbon atoms and from 0.1–20 mol percent of a tetrahydroindene.

16. The process of preparing high molecular weight, linear, amorphous copolymers from at least one polycyclic hydrocarbon polyene selected from the group consisting of bicyclo[4,3,0]nonadiene 3–7 (4,7,8,9 tetrahydroindene)
bicyclo[4,3,0]nonadiene 2–8 (6,7,8,9 tetrahydroindene)
bicyclo[4,3,0]nonadiene 2–7 (4,5,8,9 tetrahydroindene)
bicyclo[5,5,0]dodecadiene 2–7 (8)

bicyclo[4,2,0]octadiene 3–7
bicyclo[3,2,0]heptadiene 2,6
tricyclo[4,2,00²⁻⁵]octadiene 3–7
bicyclo[3,3,0]octadiene 2,6 (1,4,7,8-tetrahydropentalene)
bicyclo[4,3,0]nonatriene 2,4,7 (8,9 dihydroindene)
2,3,4,5 tetraphenyl bicyclo[4,3,0]nonatriene
2,4,7 (4,5,6,7 tetraphenyl-8,9-dihydroindene)
bicyclo[5,1,0]octadiene 2,5 (3,4-homotropylidene)
bicyclo[4,2,0]octadiene 2,7
tricyclo[5,3,0,0²⁻⁶]decadiene 3,9
tetraphenyl 1,7,8,9 tricyclo[5,2,0,0²⁻⁶]nonadiene 3,8 and at least one monomer selected from the group consisting of ethylene and higher alpha-olefins of the general formula R—CH=CH₂, wherein R is an alkyl radical containing from 1 to 6 carbon atoms, which comprises polymerizing said monomers in contact with a catalyst prepared by mixing (1) a compound of a transition metal selected from Group V of the Mendelyeev Periodic Table and (2) a compound selected from the group consisting of organometallic compounds and hydrides of the metals of Groups I, II and III of said Periodic Table.

17. The process of claim 16, further characterized in that catalyst-forming component (2) is selected from the group consisting of hydrides of complexes formed of a metal of Group I of said Periodic Table with a metal of Group III of said Table, and organometallic compounds of complexes formed of a metal of Group I of said Periodic Table with a metal Group III of said Table.

18. The process of claim 16, further characterized in that the polymerization of the monomers is in the presence of a halogen-containing catalyst.

19. The process of claim 18, further characterized in that the halogen-containing catalyst is a chlorine-containing catalyst.

20. The process of claim 16, further characterized in that the transition metal is vanadium.

21. The process of claim 17, further characterized in that the transition metal is niobium.

22. The process of claim 16, further characterized in that the transition metal is tantalum.

23. The process of claim 20, further characterized in that the vanadium compound is a vanadium halide.

24. The process of claim 20, further characterized in that the vanadium compound is a vanadium oxyhalide.

25. The process of claim 20, further characterized in that the vanadium compound has at least one of the valences of the metal saturated by a hetero atom bound to an organic group, said hetero atom being selected from the group consisting of oxygen and nitrogen.

26. The process of claim 16, further characterized in that the catalyst is prepared from a vanadium compound which is insoluble in a hydrocarbon and is selected from the group consisting of vanadium triacetate, vanadium tribenzoate, and vanadium tristearate.

27. The process of claim 16, further characterized in that the organometallic compound is an aluminum compound.

28. The process of claim 16, further characterized in that the polymerization is carried out at a temperature ranging from about —80° to +125° C.

29. The process of claim 16, further characterized in that the catalyst is prepared from a vanadium compound and an aluminum alkyl halide and the polymerization is carried out at a temperature ranging from about 0° C. to —80° C.

30. The process of claim 16, further characterized in that the polymerization is carried out in the presence of an effective amount of at least one complexing agent selected from the group consisting of ethers having the formula RYR' in which Y is selected from the group consisting of oxygen and sulfur, and R and R' are selected from the group consisting of linear and branched alkyl groups containing from 1 to 14 carbon atoms and aromatic nuclei containing from 6 to 14 carbon atoms, at least one of R and R' being a branched alkyl group or an aromatic nucleus; tertiary amines having the formula

in which R, R' and R'' are selected from the group consisting of alkyl groups containing from 1 to 14 carbon atoms and aromatic nuclei containing from 6 to 14 carbon atoms, at least one of R, R' and R'' being an aromatic nucleus; and tertiary phosphines having the formula

in which R, R' and R'' are selected from the group consisting of alkyl radicals containing from 1 to 14 carbon atoms and aromatic nuclei containing from 6 to 14 carbon atoms, at least one of R, R' and R'' being an aromatic nucleus.

31. The process of claim 30, further characterized in that the complexing agent is an ether.

32. The process of claim 30, further characterized in that the complexing agent is a tertiary amine.

33. The process of claim 30, further characterized in that the complexing agent is a trisubstituted phosphine.

34. The process of claim 30, further characterized in that the catalyst is prepared from a vanadium compound and an alkyl aluminum halide at a temperature ranging from about 0° C. to 125° C., and in the presence of about 0.5 to 1.0 mol of a complexing agent for mol of the aluminum alkyl halide.

35. The process of claim 16, further characterized in that the catalyst is prepared from an aluminum trialkyl and a vanadium halide and the molar ratio between the aluminum trialkyl and the vanadium halide ranges from about 1:1 to 5:1.

36. The process of claim 16, further characterized in that the catalyst is prepared from aluminum diethyl monochloride and vanadium triacetylacetonate and the molar ratio between the aluminum compound and the vanadium compound ranges from about 2:1 to 20:1.

37. The process of claim 16, further characterized in that the polymerization is carried out with the monomers in the liquid state.

38. The process of claim 37, further characterized in that the copolymer is prepared from a polycyclic hydrocarbon polyene, ethylene, and propylene and the molar ratio between the ethylene and propylene is less than 1:4.

39. The process of claim 37, further characterized in that the copolymer is prepared from a polycyclic hydrocarbon polyene, ethylene and butene-1 and the molar ratio of the ethylene to butene-1 is less than 1:20.

References Cited

UNITED STATES PATENTS

| | | | |
|---|---|---|---|
| 3,000,866 | 9/1961 | Tarney | 260—80.78 |
| 3,162,620 | 12/1964 | Gladding | 260—80.78 |
| 3,166,517 | 1/1965 | Ro | 252—429 |
| 3,200,174 | 8/1965 | Adamek | 260—889 |
| 3,211,709 | 10/1965 | Adamek | 260—80.7 |
| 3,489,733 | 1/1970 | Watts | 260—80.78 |

JOSEPH L. SCHOFER, Primary Examiner

R. BENJAMIN, Assistant Examiner

U.S. Cl. X.R.

260—79B, 88.2C, 88.2D, 88.2E